Sept 10, 1957 J. GUIGON ET AL 2,805,848
APPARATUS FOR TREATING AGGLOMERATES
Filed Jan. 21, 1953 2 Sheets-Sheet 1
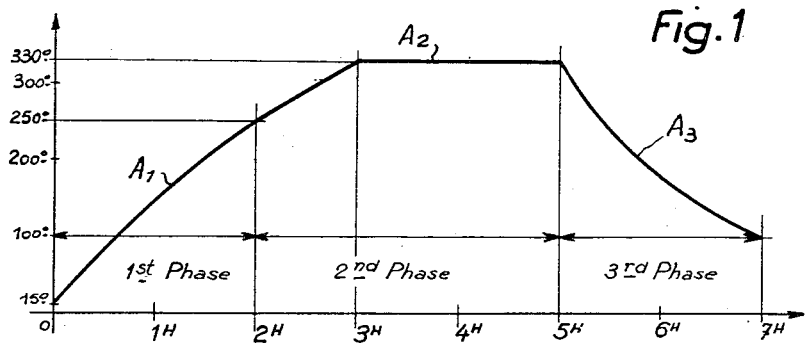
Fig. 1
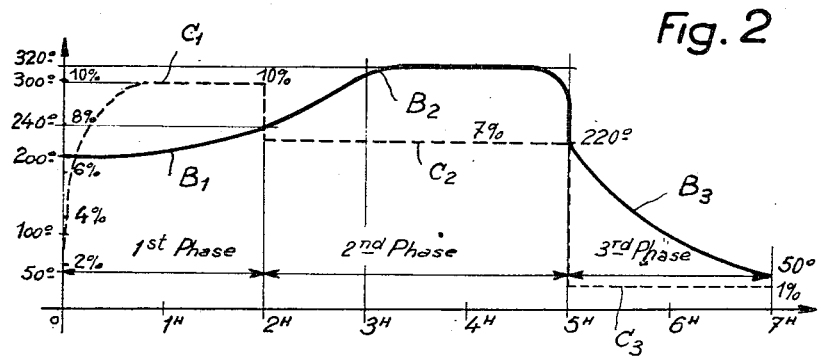
Fig. 2
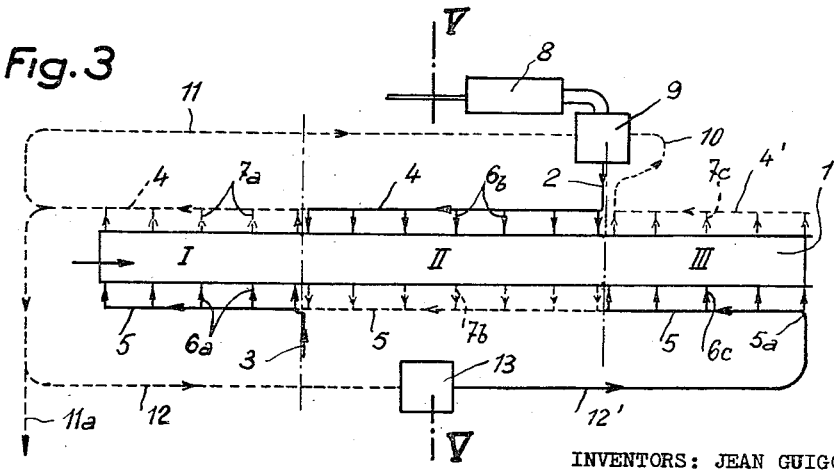
Fig. 3
INVENTORS: JEAN GUIGON,
JOSEPH CARABASSE, JACQUES SALMON,
ERNEST MATIS and CLAUDE NOBECOURT
BY 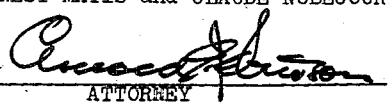
ATTORNEY Sept 10, 1957 J. GUIGON ET AL 2,805,848
APPARATUS FOR TREATING AGGLOMERATES
Filed Jan. 21, 1953 2 Sheets-Sheet 2

INVENTORS: JEAN GUIGON,
JOSEPH CARABASSE, JACQUES
SALMON, ERNEST MATIS and
CLAUDE NOBECOURT By
ATTORNEY

United States Patent Office 2,805,848
Patented Sept. 10, 1957

2,805,848
APPARATUS FOR TREATING AGGLOMERATES

Jean Guigon, Auberchicourt, Joseph Carabasse, Noeux-les-Mines, Jacques Salmon, Sailly-la-Bourse, Ernest Matis, Douai, and Claude Nobecourt, Auberchicourt, France, assignors to Etablissement Public dite: Houilleres du Bassin du Nord et du Pas-de-Calais, Douai, France, a French public establishment Application January 21, 1953, Serial No. 332,222

Claims priority, application France October 29, 1952

5 Claims. (Cl. 263—28)

This invention has for its object a plant for carrying out the process for the treatment of agglomerates of coal and pitch described and claimed in our patent specification Ser. No. 318,534, now abandoned, according to which the agglomerates are subjected to three principal successive stages of treatment, namely:

(a) A rapid oxidation causing a rise of temperature below the distillation temperature;

(b) A controlled oxidation checking the rise of temperature;

(c) A cooling in an inert atmosphere down to a temperature above 100° C.

According to our invention, we provide a plant for carrying out the process referred to above, characterised by a furnace of the tunnel type through which pass the agglomerates to be treated, comprising orifices for the circulation of a gas through the mass of agglomerates, transversally to the direction of the advance of the latter, which furnace is divided in a plurality of sections each of which is fed with a gas the temperature or the nature of which is different.

Referring to the accompanying drawings, which illustrate the characteristic features of the plant according to the invention, in the particular case of egg-shaped briquettes of lean coal agglomerated with coal-pitch, with a particular manner of carrying out the cycle of circulation of the gases, ensuring their distribution under conditions that are particularly advantageous from the point of view of the recovery of the heat generated by the treatment and of the ease with which the regulation may be carried out:

Fig. 1 is a graph of law of variation of the temperature at the surface of the briquettes;

Fig. 2 are graphs of the variations of the temperature and of the oxygen content of the gases sent through the mass of agglomerates, during the three stages of the process;

Fig. 3 is a diagrammatic plan of the whole installation, the means for recycling having been omitted for simplicity of illustration;

Figure 4:
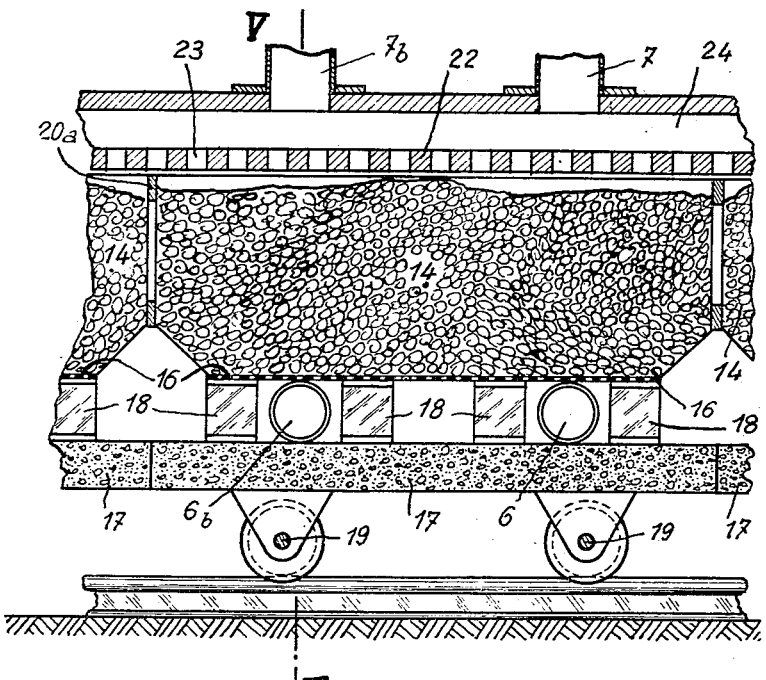
Fig. 4 is a partial longitudinal section of the tunnel-shaped furnace.

As it is seen on the graphs, which are based on the time taken by the operations, the first stage of rapid oxidation, during which the temperature of the briquettes (graph $A_1$) pass from the ambient temperature (15° C.) to the temperature of 250° C. (temperature which is lower than that of the distillation of coal), is obtained by blowing through the mass gases the oxygen content of which (graph $C_1$) is maintained at 10% and the temperature of which (graph $B_1$) increases gradually during approximately two hours from 200° C. to 240° C.

The second stage of checked oxidation has for its effect to raise the temperature of the briquettes to a temperature of 330° C. (graph $A_2$) higher than the temperature of the first stage, but also lower than the temperature of distillation, and to maintain them a certain time at that temperature. This result is obtained by reducing the oxygen contents of the gases blown through from 10% to 7% (graph $C_2$), the temperature of these gases being gradually raised to a temperature slightly lower than the temperature of the briquettes, for example 320° C. during the first part of this checked oxidation, and then maintained constant (graph $B_2$).

For the third stage, of cooling in an inert atmosphere (down to 100° C., in the example under consideration, see graph $A_3$), the oxygen contents of the gases blown through is brought back to the neighbourhood of 1% (graph $C_3$), the temperature of these gases being at the beginning in the vicinity of 200° C. and decreasing gradually down to about 50° C. at the end of the operation.

A fourth stage of the process (cooling in the air in thin layer) is carried out outside the plant according to the present invention.

This plant is therefore characterised first of all in that the products are treated continuously in a furnace comprising three sections I—II—III, disposed one following the other, in each of which takes place one of the stages which have just been described and through which travel the products. The conditions of temperature and of oxygen content of the gas blown through the mass must therefore vary along the length of the furnace, in conformity with the graphs of Fig. 2, that is to say, the abscissa of these graphs may be considered as representing the length of the furnace as well as the time taken by the operations.

Consequently, the speed of the displacement of the agglomerates in the furnace is determined as a function of the length of the latter in order to ensure the times taken by the treatment defined above. All along the furnace are disposed from point to point orifices for the admission and the exhaust, respectively, of the gases passing through the mass to be treated, transversely to the direction of this displacement.

The gases used for the treatment are principally constituted by the combustion gases of a hearth, the oxygen content and the temperature of which are regulated in the different parts of the furnace to the value determined according to the diagram of Fig. 2 by the addition of fresh air, introduction in a section of the furnace of the exhaust gases from another section, with, eventually, cooling of these gases in a suitable refrigerating device.

In order to render the temperature of the mass of briquettes being treated as uniform as possible in each section of the furnace, it has been ascertained that it is advantageous to increase the quantity of gas circulating through this mass. To this end, it is possible, in each section, to increase the quantity of gas circulating from the admission flue to the exhaust flue, by a certain quantity of gas recycled directly over themselves. This arrangement, besides, presents an additional possibility of regulating the temperature of these gases.

The plant represented diagrammatically in Fig. 3 comprises essentially a furnace of the tunnel type 1 in which the agglomerates to be treated move in the direction of the arrow in a manner which will be described hereafter, and the length of which is determined as a function of the speed of advance, so that the agglomerates entering on the left issue on the right when the third stage of the treatment recalled above is terminated.

This furnace does not present internally any solution of continuity. The three sections I—II—III are nevertheless delimited by the location of the pipes 2 and 3 by which are introduced in the furnace on the one hand fresh air, on the other hand the combustion gases of a hearth, under conditions which are going to be described. These pipes communicate with two distribution flues 4 and 5 extending along the whole length of the furnace and disposed, as is more particularly seen in Fig. 5, so that they form one block with it, thereby simplifying the recycling arrangement which will be described further on. In the drawing (Fig. 3) the portions of flue which serve for the admission in a section have been shown in full lines while the portions which serve for the exhaust have been shown in broken lines. It will also be seen that the flue 4 is discontinuous, its downstream portion 4' not communicating with the upstream portion 4.

From point to point, branching-off passages for admission 6a—6b—6c (in full lines) and for exhaust 7a—7b—7c (in broken lines) connect these two flues 4 and 5 by passing across the furnace, that is, through the mass of agglomerates being treated, in the manner which will be more completely described with reference to Fig. 5; it is only for the convenience of the diagrammatic representation of Fig. 3 that the flues 4 and 5 have been shown at a certain distance from the walls of the furnace and that the branching off pasages 6a—6b—6c and 7a—7b—7c are disposed horizontally and not vertically, as will be seen in Fig. 5.

The feeding circuit of the furnace comprises besides the following elements: the mass of the gases used for the treatment of the agglomerates is constituted by the combustion gases of a hearth 8, the oxygen content of which is regulated to the desired value. These combustion gases issue directly in a mixing chamber 9 from which come the three following pipes: a pipe 2 connected directly to the portion 4 of the flue supplying the sections I and II of the furnace; a pipe 10 connected to the portion 4' of the flue 4 and a pipe 11 connected to the other end of the flue 4 upstream of the section I.

The installation finally comprises a third pipe 12—12' extending along the whole length of the plant but not being in contact with the furnace. This pipe is also connected to the flue 4 and brings back a portion of the gases coming from the upstream end of the latter, to a point 5a at the downstream end of the flue 5, that is to say on the outlet end of the furnace. On this pipe 12—12' is disposed a heat exchanger shown diagrammatically at 13, intended to cool the gases brought back from the left end of the flue 4 to the right end of the flue 5.

The circuit which has just been described comprises evidently circulating fans and regulating valves of any type. It is completed by an exhaust pipe adjustably open to the atmosphere at 11a, the rate of flow of which corresponds to that of the inflow of gas and air at 8 and at 3.

The installation which has jut been described allows to carry out the various stages of the process recalled above, in the following conditions:

In the section I of the furnace where takes place the first stage of the treatment, it has been seen that the gases passing through the mass of agglomerates must have a temperature which is lower than in the section II and which continuously decreases from the right part to the left part (graph $B_1$, Fig. 2) and an oxygen content which is greater than in that section (graph $C_1$, Fig. 2).

To this end, the branching off passages for admission 6a of this section I of the furnace are provided on the flue 5, supplied, as will be seen, with hot gases by the branching off passages for exhaust 7b of the section II. The cooling of these gases, from the upstream part to the downstream part, results besides from the heat exchange with the agglomerates which enter the furnace at the ambient temperature. The enrichment of the oxygen content with respect to that of the gases issuing from II results on the other hand from the re-entrance of atmospheric air at 3.

In the section II, the branching off passages are reversed with respect to the section I, that is to say, the gases circulate from the flue 4 towards the flue 5. Now, the gases feeding this flue 4 are hot gases coming from the hearth 8 after having been mixed in the chamber 9 with a certain quantity of cooler gases coming from the section III by the pipe 10 and a certain quantity of hot gases coming from the section I by the pipe 11; the proportions of these three gases are determined in order to obtain the desired temperature defined by the graph $A_2$ (Fig. 1). The oxygen content of this mixture of gases is added to the desired value (graph $C_2$, Fig. 2) by adjusting the richness of the combustion gases of the hearth 8.

In the section III, the branching off passages are in the same direction as in the section I, that is to say that the gases circulate again from the flue 5 towards the flue 4', the flue 5 being supplied at 5a by the pipe 12' coming from the refrigerator 13. These gases are cold gases which become gradually warm from the right to the left (graph $A_3$, Fig. 2), by heat exchange with the agglomerates owing to the recycling. The oxygen content of these gases must be very small (graph $C_3$, Fig. 2), so that they act like an inert gas at the temperature at which the agglomerates are raised. Such is the case for these gases, issuing from the oxidation zone of the section I of the furnace, entering at 5a.

It is therefore seen that the cycle of distribution which has just been described allows in a very simple manner to ensure the existence of the conditions required by the technique of the process. Of course, regulating valves will be disposed on the different pipes connected to the principal flues 4 and 5, for adjusting the temperature and the richness in oxygen of the gases in circulation to the desired value in the various zones of the furnace.

Figure 5:
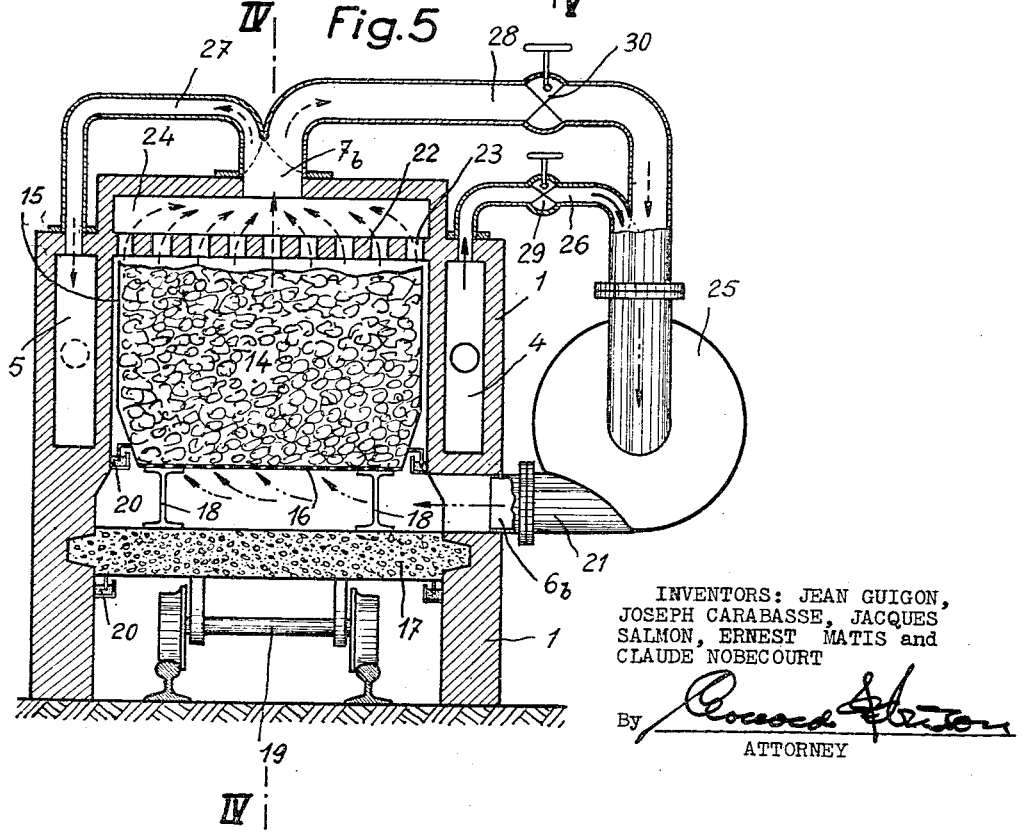
Fig. 5 is a transverse section of the furnace along V—V of Figs. 3 and 4.

Figs. 4 and 5 show a practical embodiment of the furnace and particularly the arrangement of the branching off passages 6 and 7 ensuring the circulation of the gases (and their re-cycling) in the mass of agglomerates, together with the manner in which these are displaced.

The mass 14 of agglomerates or briquettes to be treated is disposed in a series of small trucks the lateral walls 15 of which are solid and are shaped so as to conform to the section of the furnace 1. It rests on a perforated bottom 16 permitting the free passage of the gases and resting itself on the chassis or base-plate 17 of the small truck, constructed for example of fire-proof concrete, through uprights 18 permitting also the free passage of the gases. This base-plate is itself supported by a rolling train of any kind.

Precautions are taken to ensure the fluid-tightness of the lateral walls 15 and of the base plate 17 with the corresponding walls of the furnace 1. This fluid-tightness is ensured in the transverse direction by joints 20 of sand and, accessorily, by the fire-proof base-plate fitting in the corresponding part of the wall of the furnace, which are recessed longitudinally to receive the edge of the base-plate.

The longitudinal fluid-tightness between the small trucks is ensured by the contact of erected plates 26a surrounding these small trucks.

The displacement of the small trucks along the furnace may take place simply by pushing; the contact of the different trucks among themselves being ensured by the push itself.

In the walls of the furnace 1 are disposed from point to point orifices 21 in which are engaged the pipe 6a—6b—6c connected to the flue 4 or 5 according to the section considered, as it has been described above.

The lateral walls of the furnace 1 are double, that is to say, they are provided with a recess constituting the flue 4 or 5 for the general supply of the furnace.

This furnace is closed at its upper portion by a perforated partition 22—23 permitting the passage of the gases coming out of the mass of agglomerates towards a longitudinal chamber 24 in which are disposed from point to point the branching off pipes 7a—7b—7c.

In the preceding theoretical description, the circulation takes place simply from the flue 4 to the flue 5, or reciprocally, this circulation is ensured by an adjustable fan 25 aspirating from the flue 4 by the pipe 26 and forcing in the flue 5 through the mass of the briquettes and the pipes 7b and 27.

As it has been indicated before, it is advantageous in practice to increase the gaseous volume passing through the briquettes in each section, with respect to that resulting from the rate of flow in the flues 4 and 5 only, and to suit this volume to the conditions under which the work proceeds in the different sections.

To this end, a pipe 28 allows to bring back in contact with the agglomerates a portion of the gases having already traversed them, and the respective and total rates of flow of the pipes 28 and 26 are adjusted to the desired value, for example by means of valves shown diagrammatically at 29 and 30.

What we claim is:

1. Apparatus for treating carbon agglomerates comprising a tunnel-type furnace divided into at least three longitudinally successive zones and having two longitudinally extending conduits along the opposite sides thereof with portions of said conduits corresponding to the respective zones, said furnace further having inlet and outlet orifices in each of said zones and communicating with the related portions of said conduits, the inlet and outlet orifices in each of said zones being spaced apart along the respective zone and opening into and from the latter at the lower and upper portions of the furnace, means for conveying the agglomerates to be treated longitudinally through said furnace so that gases circulated from the inlet orifices to the outlet orifices in each of said zones will pass through the conveyed agglomerates in directions at right angles to the longitudinal movement of the agglomerates, a hearth disposed externally of said furnace producing combustion gases having a variable oxygen content, a mixing chamber receiving combustion gases from said hearth, means conducting a regulated quantity of exhaust gases from the upstream end of the portion of one of said conduits communicating with the outlet orifices of the third of said zones back to said mixing chamber, means conducting a part of the exhaust gases from the upstream end of the portion of one of said conduits communicating with the outlet orifices of the first of said zones back to said mixing chamber, means supplying the mixture of combustion gases and exhaust gases from said mixing chamber to the downstream end of the portion of one of said conduits communicating with the inlet orifices of the second of said zones, the inlet and outlet orifices of said first and second zones opening into communicating portions of the same longitudinal conduit so that the exhaust gases from said second zone are supplied to the downstream end of said conduit portion opening into said inlet orifices of said first zone, means also supplying fresh air to said downstream end of the conduit portion opening into said inlet orifices of said first zone, means cooling other parts of the exhaust gases from the upstream end of said conduit portion communicating with said outlet orifices of said first zone, means for supplying the cooled exhaust gases from said cooling means to the downstream end of the conduit portion opening into the inlet orifices of said third zone, and adjustable means open to the atmosphere for exhausting still another part of the exhaust gases from the outlet orifices of said first zone at a rate equal to that at which the mixture of combustion gases and exhaust gases are supplied to the inlet orifices of said second zone and fresh air is supplied to the inlet orifices of said first zone.

2. Apparatus as in claim 1; further comprising recycling means for at least one of said zones receiving a regulated part of the exhaust gases from at least one of the outlet orifices of the related zone and mixing the received exhaust gases with the gases supplied to at least one of the inlet orifices of said related zone.

3. Apparatus as in claim 2; wherein said recycling means includes a duct extending from said one outlet orifice and having two branches, one of said branches extending to the conduit portion receiving exhaust gases from the outlet orifices of said releated zone, a variable output fan having its inlet connected to the other of said branches and to the conduit portion carrying gases to be supplied to said inlet orifices of said related zone and having the fan outlet connected to at least one of the inlet orifices of said related zone, and valve means for regulating the proportions of gases supplied to the fan inlet from said other branch and said conduit portion connected to the fan inlet.

4. Apparatus as in claim 1; wherein said means for conveying the agglomerates to be treated through the furnace includes a train of cars moving longitudinally through said tunnel-type furnace and having perforated bottom walls at a level above the inlet orifices opening into the furnace in said zones, and channeled sealing means disposed between the side walls of said cars and of said furnace at a level above that of said perforated bottom walls so that all of the gases supplied to said inlet orifices must circulate through the agglomerates in said cars to reach the related outlet orfiices.

5. Apparatus as in claim 4; wherein said means for conveying the agglomerates to be treated further includes sealing means between the adjacent end walls of successive cars of said train to prevent circulation of gases between said first, second and third zones of the tunnel-type furnace through the spaces between said successive cars.

References Cited in the file of this patent

UNITED STATES PATENTS

| | | |
|---|---|---|
| 1,294,756 | Benjamin | Feb. 18, 1919 |
| 1,330,366 | Alexander | Feb. 10, 1920 |
| 1,505,768 | Dressler | Aug. 19, 1924 |
| 1,682,680 | Maurel | Aug. 28, 1928 |
| 1,704,280 | Burton | Mar. 5, 1929 |
| 1,727,192 | Baily | Sept. 3, 1929 |
| 2,386,835 | Beaty | Oct. 16, 1945 |
| 2,573,019 | Hess | Oct. 30, 1951 |
| 2,678,205 | Buhler et al. | May 11, 1954 |

FOREIGN PATENTS

| | | |
|---|---|---|
| 44,085 | Sweden | July 28, 1917 |